United States Patent
Khan et al.

(10) Patent No.: US 12,033,035 B2
(45) Date of Patent: Jul. 9, 2024

(54) METHOD AND APPARATUS FOR PREDICTING KERNEL TUNING PARAMETERS

(71) Applicant: Advanced Micro Devices, Inc., Santa Clara, CA (US)

(72) Inventors: Jehandad Khan, Austin, TX (US); Daniel Isamu Lowell, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 742 days.

(21) Appl. No.: 16/560,954

(22) Filed: Sep. 4, 2019

(65) Prior Publication Data

US 2021/0065051 A1   Mar. 4, 2021

(51) Int. Cl.
*G06N 20/00* (2019.01)
*G06F 11/34* (2006.01)
*G06N 3/02* (2006.01)

(52) U.S. Cl.
CPC ......... *G06N 20/00* (2019.01); *G06F 11/3409* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 10,032,256 B1 | 7/2018 | Anaya et al. | |
| 2016/0127004 A1* | 5/2016 | Winiecki | H04B 17/14 455/77 |
| 2017/0185871 A1 | 6/2017 | Zhang et al. | |
| 2018/0060744 A1* | 3/2018 | Achin | G06N 5/04 |
| 2018/0129972 A1* | 5/2018 | Chen | G06N 3/0454 |
| 2019/0205606 A1 | 7/2019 | Zhou et al. | |

FOREIGN PATENT DOCUMENTS

| | | | |
|---|---|---|---|
| EP | 3 364 343 A1 | 8/2018 | |
| WO | WO-2020210400 A1 * | 10/2020 | G06N 20/00 |

OTHER PUBLICATIONS

"Automatic Online Tuning of HPC Applications", Robert Mijakovic; Munich Technical University, Nov. 20, 2017; Retrieved on Nov. 11, 2020 from the Internet: <URL: https://mediatum.ub.tum.de/doc/1402278/1402278.pdf>.

(Continued)

*Primary Examiner* — Umut Onat
(74) *Attorney, Agent, or Firm* — Volpe Koenig

(57) ABSTRACT

A processing device, which improves processing performance, is provided which comprises memory configured to store data and a processor, in communication with the memory. The processor is configured to receive tuning parameters, each having a numeric value, for executing a portion of a program on an identified hardware device and convert the numeric values of the tuning parameters to words. The processor is also configured to predict, using one or more machine language learning algorithms, which combination of the words to execute the portion of the program on the identified hardware device based on performance efficiency and convert the predicted combination of the words to corresponding numeric values for executing the portion of the program on the identified hardware device.

22 Claims, 4 Drawing Sheets

(56) References Cited

OTHER PUBLICATIONS

Papenhausen, E. & Mueller, K., "Coding Ants—Optimization of GPU Code Using Ant Colony Optimization," Preprint submitted to Computer Languages, Systems & Structures, 42 pgs., Jul. 24, 2018.
Lim, Robert V., et al., "Autotuning GPU Kernels via Static and Predictive Analysis", arXiv:1701.08547v3, 10 pgs., Jun. 29, 2017.
Singh, Ranvijay, et al., "Snowpack: Efficient Parameter Choice for GPU Kernels via Static Analysis and Statistica Prediction", 8th Workshop on Latest Advances in Scalable Algorithms for Large-Scale Systems, ACM 2017, 8pgs., Nov. 2017.
Van Werkhoven, B., "Kernel Tuner: A search-optimizing GPU code auto-tuner", Future Generation Computer Systems vol. 90, Elsevier, pp. 347-358, 2019.
Nugteren, C. & Codreanu, V., "CLTune: A Generic Auto-Tuner for OpenCL Kernels", arXiv:1703.06503v1, 8 pgs , Mar. 19, 2017.
Gupta, R., et al., "STATuner: Efficient Tuning of CUDA Kernels Parameters", The International Conference for High Performance Computing, Networking, Storage and Analysis (SC 2015), 2 pgs., 2015.
Bergstra, J., et al., "Machine Learning for Predictive Auto-Tuning with Boosted Regression Trees", 2012 Innovative Parallel Computing, 9 pgs., May 2012.
Bruel, P., et al., "Autotuning CUDA Compiler Parameters for Heterogeneous Applications using the OpenTuner Framework", Concurrency and Computation: Practice and Experience, 13 pgs , Nov. 25, 2017.
Rasch, A., & Gorlatch, S., "ATF: A Generic Directive-Based Auto-Tuning Framework", Concurrency Computation Practice and Experience, 14 pgs., John Wiley & Sons, Ltd., Jan. 2018.
Falch, T.L. & Elster, A.C., "Machine Learning Based Auto-Tuning for Enhanced OpenCL Performance Portability", arXiv:1506.00842V1, 14 pgs., Jun. 2, 2015.
Konstantinidis, E. & Cotronis, Y., "A Quantitative Roofline Model for GPU Kernel Performance Estimation Using Micro-Benchmarks and Hardware Metric Profiling", Journal of Parallel and Distributed Computing, vol. 107 Elsevier, pp. 37-56, Sep. 2017.
Tillman, M., et al., "Application-independent Autotuning for GPUs", Advances in Parallel Computing, vol. 25, 10 pgs., Sep. 2013.
Magni, A., et al., "Input-aware Auto-tuning for Directive-based GPU Programming", Proceedings of the 6th Workshop on General Purpose Processor Using Graphics Processing Units (GPGPU-6), pp. 66-75, Mar. 16, 2013.
Guerreiro, J., et al., "Multi-kernel Auto-Tuning on GPUs: Performance and Energy-Aware Optimization", 23rd Euromicro International Conference on Parallel, Distributed, and Network-Based Processing, IEEE, 8 pgs., Mar. 2015.
Cummins, C., et al., "End-to-End Deep Learning of Optimization Heuristics", 26th International Conference on Parallel Architecture Compilation Techniques (PACT), 14 pgs , Sep. 2017.

\* cited by examiner

METHOD AND APPARATUS FOR PREDICTING KERNEL TUNING PARAMETERS

BACKGROUND

A program's performance efficiency is determined, for example, by the speed or amount of time in which instructions of the program execute on hardware (e.g., integrated circuit (IC) or chip). The physical characteristics and specification of hardware vary between different generations or versions of the hardware. Accordingly, the performance efficiency of a program typically varies greatly between the different generations of the hardware device. Programs typically include tuning parameters which are used to change the performance efficiency of a program for different hardware.

BRIEF DESCRIPTION OF THE DRAWINGS

A more detailed understanding can be had from the following description, given by way of example in conjunction with the accompanying drawings wherein.

DETAILED DESCRIPTION

Figure 1:
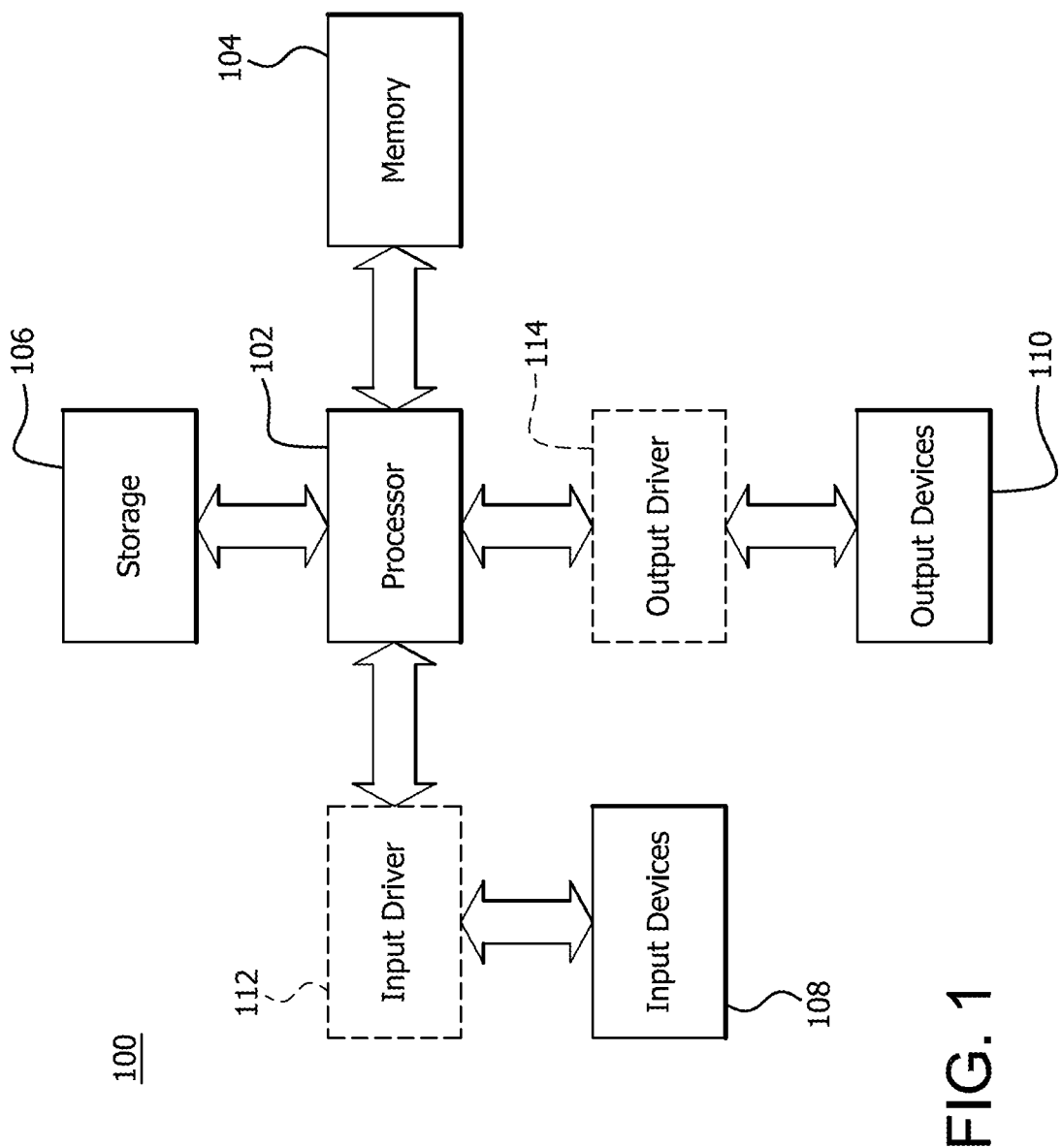
FIG. 1 is a block diagram of an example device in which one or more features of the disclosure can be implemented.

Prior to programs being deployed for execution on identified hardware devices, the programs are typically profiled for the identified hardware by executing the program using different combinations of program tuning parameters, resulting in varied performance efficiency. Program tuning parameters for the identified hardware are selected based on the resulting performance efficiencies.

The performance efficiency of a program varies based on the values of the tuning parameters in the program. A program typically includes multiple tuning parameters (e.g., 10 parameters), each having a plurality of different selectable values (e.g., 10 values). While different combination of these tuning parameters values compute correct results, these results are produced with varying performance efficiencies.

Conventional profiling systems determine the tuning parameter values of a program (e.g., GPU compute kernel) via search algorithms that traverse the solution space. For example, for matrix multiplication instructions, conventional systems must continually search through a data base of stored tuning parameter values for each combination of matrix sizes to be multiplied.

These search algorithms are costly and time consuming. For example, these conventional search algorithms typically require large sets of costly compute resources and a large amount of time to tune the programs (e.g., kernels). In addition, the tuning is applied only to selected programs. Execution of unselected programs typically results in a degraded performance and users choosing to tune their own kernels will experience a long delay. Also, these conventional search algorithms do not provide tuning parameters values which account for different input sizes to each program and the different types of problems the programs are attempting to solve.

The devices and methods described herein efficiently determine tuning parameter values for a program to be executed on identified hardware without the use of inefficient search algorithms by using machine learning algorithms to predict tuning parameter values based on input values (e.g. input tensor values including dimensions of an image, dimensions of a matrix, a number of color channels, a number of operations to execute).

In contrast to a conventional machine learning model which outputs numeric values based on input numeric values, the machine learning algorithms described herein convert input numeric values to words (i.e., one or more letters of a language) and use a language model to predict the parameters from the inputted words. The language learning algorithms learn to translate from a source language (e.g., an input word or word sequence converted from one or more numeric values) to a target language (e.g., an output word sequence). The output words are then converted back to numerical values to obtain executable tuning parameter values.

The tuning parameter values are predicted based on the tuning parameter values input to the program in a sequence (as opposed to parallel input) and encoding the tuning parameter values as discrete words instead of scalar numbers. The discrete words are then translated using neural machine language translation techniques (e.g., techniques which translate sentences from one language to another using a combination of Multi-Layer Perceptron (MLP) and other ML primitives such as convolutions, activations, batch normalization, dropout and Recurrent Neural Networks (RNNs).

In contrast to conventional language models, the machine learning language algorithms described herein predict the tuning parameter values based on predetermined (i.e., determined prior to runtime) constraints (e.g., combinations of parameter values are invalid, a maximum number of registers assigned per thread and an amount of memory accessible per thread). The constraints prevent values, which are incapable of concurrently existing or which would produce an invalid result, from being predicted as the tuning parameter values. Accordingly, the constraints facilitate a more efficient prediction process because the tuning parameter values are predicted from a smaller space (i.e., smaller number of potential parameter values) and also provide a more accurate prediction because the selected tuning parameter values avoid an invalid result.

A processing device, which improves processing performance, is provided which comprises memory configured to store data and a processor, in communication with the memory. The processor is configured to receive tuning parameters, each having a numeric value, for executing a portion of a program on an identified hardware device and convert the numeric values of the tuning parameters to words. The processor is also configured to predict, using one or more machine language learning algorithms, which combination of the words to execute the portion of the program on the identified hardware device based on performance efficiency and convert the predicted combination of the words to corresponding numeric values for executing the portion of the program on the identified hardware device.

A method which improves processing performance is provided which comprises receiving tuning parameters, each having a numeric value, for executing a portion of a program on an identified hardware device and converting the numeric values of the tuning parameters to words. The method also comprises predicting, using one or more machine language learning algorithms, which combination of the words to execute the portion of the program on the identified hardware device based on performance efficiency and converting the predicted combination of the words to corresponding numeric values for executing the portion of the program on the identified hardware device.

A non-transitory computer-readable storage medium is provided which includes instructions for causing a computer to execute a method comprising receiving tuning parameters, each having a numeric value, for executing a portion of a program on an identified hardware device and converting the numeric values of the tuning parameters to words. The method also includes predicting, using one or more machine language learning algorithms, which combination of the words to execute the portion of the program on the identified hardware device based on performance efficiency and converting the predicted combination of the words to corresponding numeric values for executing the portion of the program on the identified hardware device.

As used herein, programs includes any sequence of instructions to be executed using one or more processors to perform procedures or routines (e.g., operations, computations, functions, processes, jobs). As used herein, execution of programmed instructions (e.g., applications, drivers, operating systems or other software) on a processor includes any of a plurality of stages, such as but not limited to fetching, decoding, scheduling for execution, beginning execution and execution of a particular portion (e.g., rendering of video on full screen) of the programmed instructions. Programmed instructions include tuning parameters and tuning parameters settings having tunable (i.e., changeable) values used to control the performance efficiency of a program executing on a hardware device.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
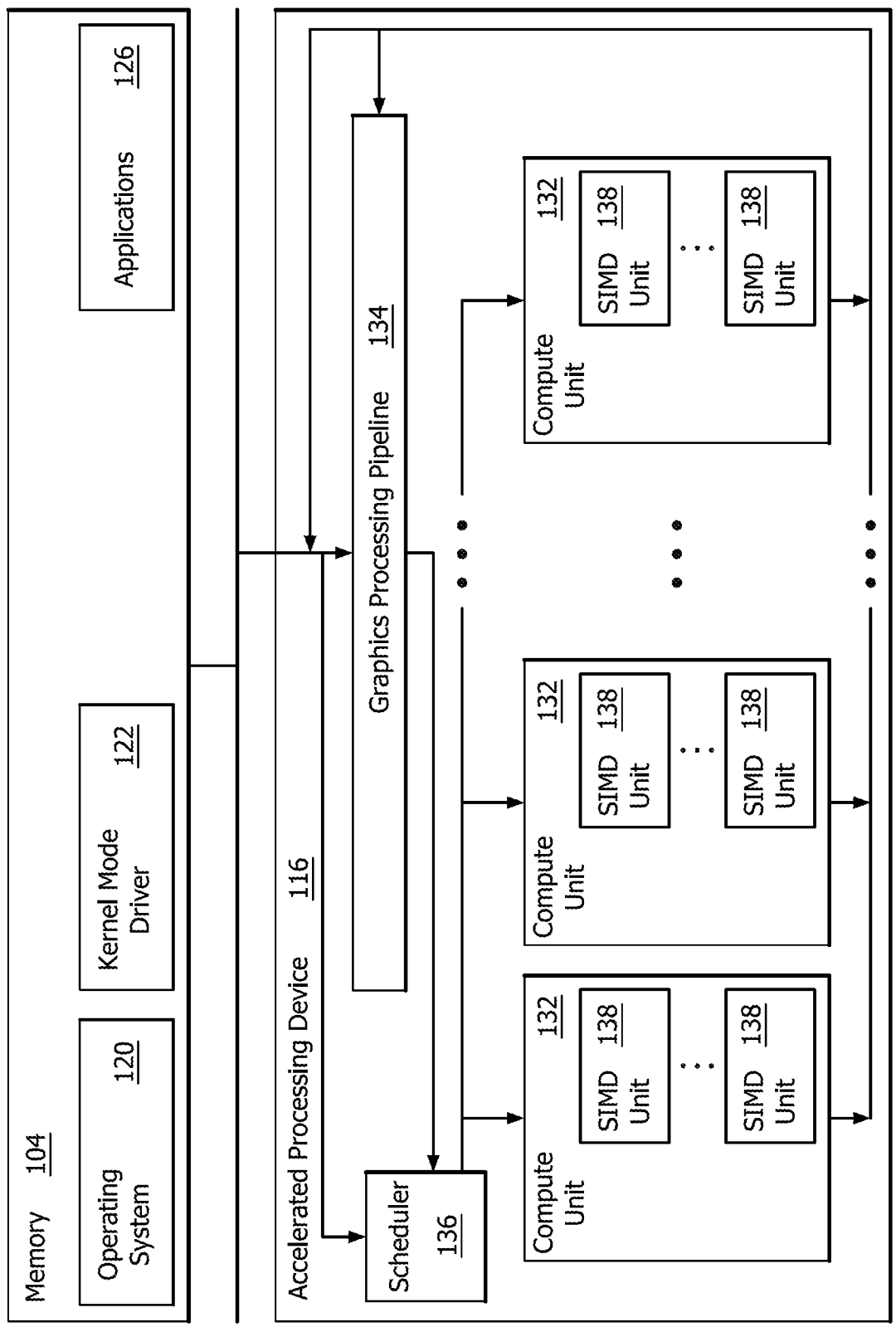
FIG. 2 is a block diagram of the device of FIG. 1, illustrating additional detail.

FIG. 2 is a block diagram of the device 100, illustrating additional details related to execution of processing tasks on the APD 116. APD 116 includes a plurality of compute units 132, processing pipeline (e.g., graphics processing pipeline) 134 and scheduler 136. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
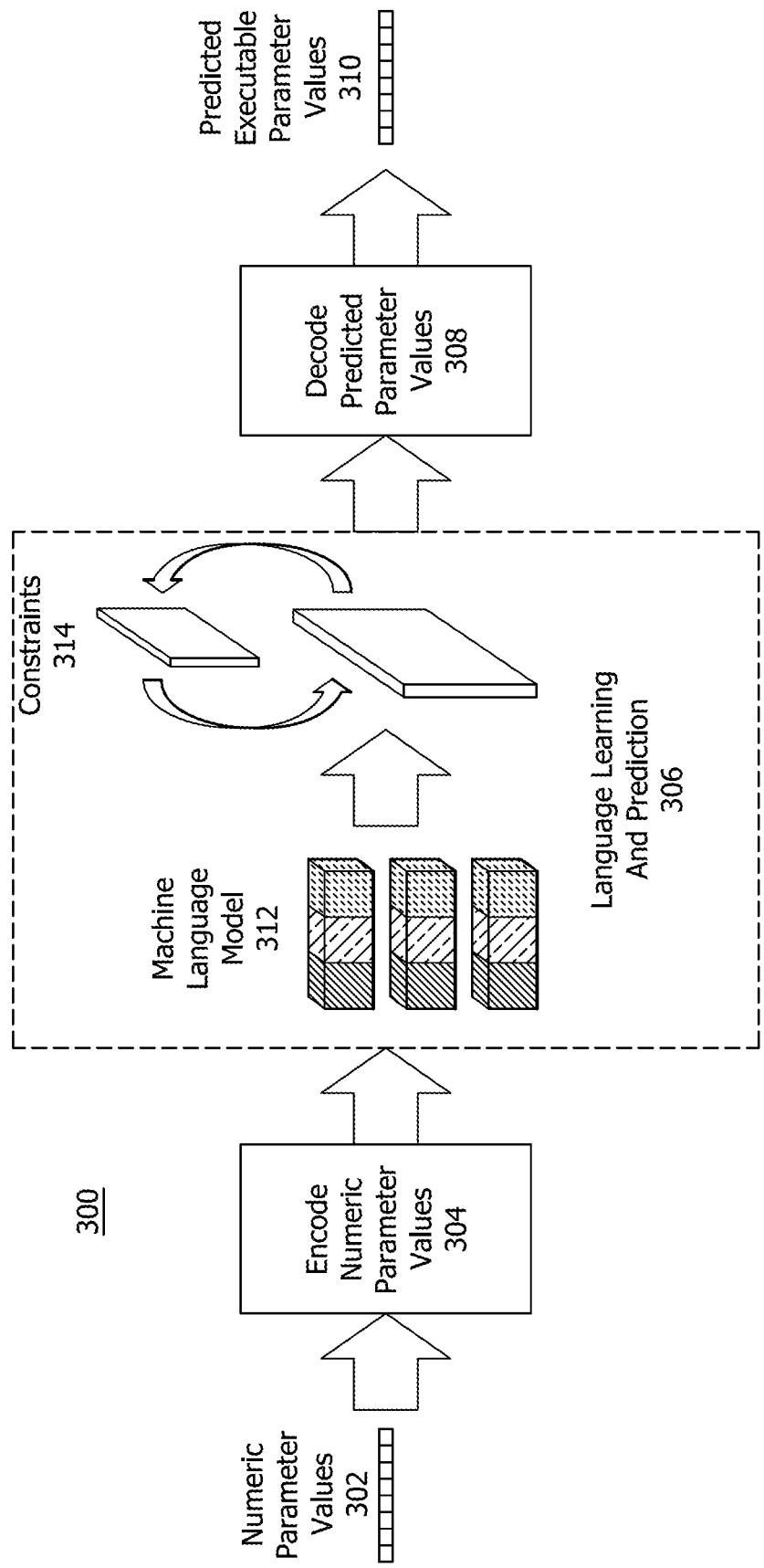
FIG. 3 is a block diagram illustrating an example method of predicting program tuning parameters.

FIG. 3 is a block diagram illustrating an example method 300 of predicting tuning parameters for a program executing on identified hardware device. Each portion of the method 300, such as encoding, converting, language learning, comparing and predicting is performed for example, by a processor such as APD 116.

Tuning parameters include parameters which are categorical in nature (e.g., parameters which represents options supplied to the program to vary the performance efficiency of the program) as well as parameters having numeric values for a tuning a particular parameter, such as for example, an amount of data to be accessed from memory (e.g., main memory), a number of parallel memory accesses (e.g., read, write) across a link to be performed, a number of channels of the input image (e.g., color channels of an image), a number of output channels (e.g., output channels of a hyperspectral image), a depth of pipeline (e.g., input depth and output depth). Target values for the tuning parameters are determined according to input parameters, such as for example, an image height, an image width, a total number of input channels, a total number of output channels and a number of images to be processed at a time. In addition, tuning parameters vary due, in part, to parameters having different interpretations between programs.

As shown at 302 in FIG. 3, the method 300 includes receiving numeric values for a plurality of tuning parameters of a program to be executed on an identified hardware device (e.g., identified version of a hardware device). Each numeric tuning parameter value is, for example, sequentially received (i.e., in series) by APD 116.

As shown at 304 in FIG. 3, the method 300 includes encoding the numeric values in the sequence of tuning parameters. The encoding is performed by converting the tuning parameter values from numeric values to words of a language. Conversion of the tuning parameter values include converting one numerical value to a word, converting one or more numerical values to a word and converting one numerical value to a plurality of words. Examples of encoding include one-hot encoding and dense vectors created from the one hot encoding.

Each converted word is provided to the machine language model 312 and predicted based on constraints 314 as part of the language learning and prediction process 306, which uses machine language learning and prediction algorithms to predict which words to use to execute the program on the identified hardware device based on performance efficiency. That is, the machine language learning algorithms predict which combination of words (corresponding to the numerical tuning parameter values) will result in efficiently executing a portion of the program on the identified hardware device (e.g., which combination of words will result in execution of a portion of the program faster than other combination of words or in less time than other combination of words).

The machine language model 312 processes the converted word values of the tuning parameters according to one or more machine learning primitives. Example of machine learning primitives include: convolutional neural networks (CNNs); convolution and pooling layers; recurrent neural networks (RNNs) which include unidirectional and bi-directional long-short-term memory (LSTM) cells or gated recurrent units (GRU); and densely connected deep neural networks with dropout and different activation functions.

The words are predicted based on the constraints 314, which include, for example, combinations of parameter values are invalid, maximum number of registers assigned per thread and amount of memory accessible per thread. The constraints 314 prevent the prediction of tuning parameter values which are incapable of concurrently existing with one or more other tuning parameter values or which would produce an invalid result. The constraints facilitate efficiency because the prediction is performed in a smaller space. Further, the constraints improve the accuracy of the prediction because the predicted tuning parameter values do not produce an invalid result.

As shown at 308 in FIG. 3, the method 300 includes decoding the predicted tuning parameter values. The decoding is performed by converting the predicted tuning parameter word values back to numeric values. As shown at 310 in FIG. 3, the predicted tuning parameter numeric values are then provided as the predicted executable tuning parameter values. The portion of the program is executed on the identified hardware device using the predicted executable tuning parameter values.

Figure 4:
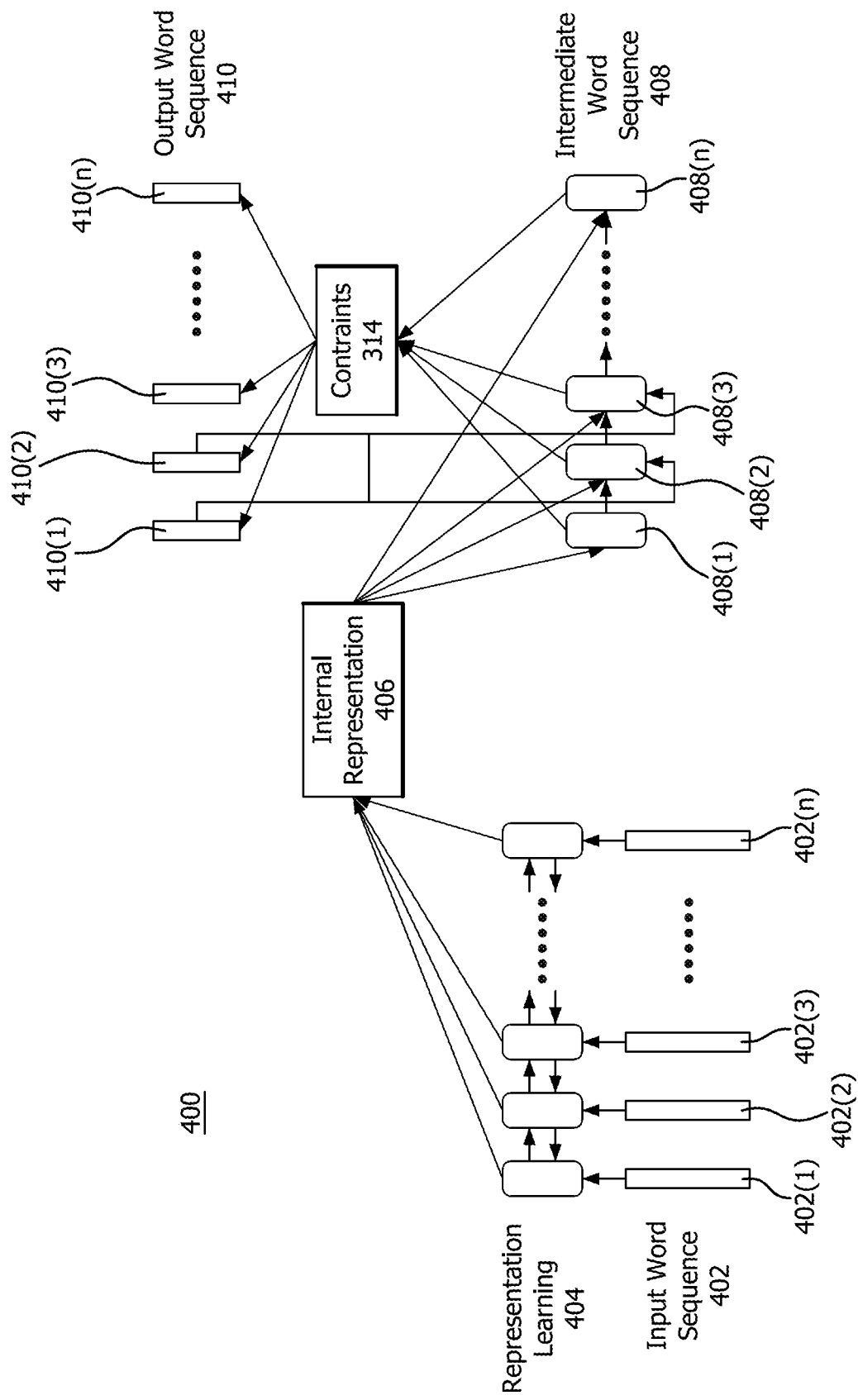
FIG. 4 illustrates an example method of implementing the language learning and prediction shown in FIG. 3.

An example of the language learning and prediction process 306 is now described in more detail with regard to FIG. 4. As described above, in contrast to conventional systems for determining tuning parameters which receive a plurality of tuning parameter values in parallel, the tuning parameter values are predicted, according to features of the present disclosure, based on the tuning parameter values input to the program in a sequence. That is, each input tuning parameter value is sequentially received (i.e., in series) and tuning parameter values are predicted as a sequence.

FIG. 4 illustrates an example method 400 of implementing the language learning and prediction shown at 306 in FIG. 3 in which each input tuning parameter value is sequentially received. As described in more detail below, FIG. 4 illustrates stages of the prediction sequence, including the filtering of intermediate tuning parameter value candidates using the constraints 314 and using predicted tuning parameter value candidates (e.g., candidates determined as being more likely to execute the portion of the program with better performance efficiency than other tuning parameter value candidates) to predict next tuning parameter value candidates in the sequence. Each portion of the method 400, such as encoding, converting, language learning, comparing, filtering, determining and predicting, is performed, for example, by a processor such as APD 116.

As shown in FIG. 4, each word 402(1)-402(n) of an input word sequence 402 is received. A representation learning process 404 is performed for each word 402(1)-402(n) according to one or more machine learning primitives (e.g., one or more of the machine learning primitives described above) to determine an internal representation 406 (e.g., a compressed representation of the words 402(1)-402(n) internal to the machine language model 312). Each block of the representation learning 404 represents, for example, a memory cell used to determine an internal representation of a corresponding word of the input word sequence 402.

For example, during the representation learning 404, an internal representation of the first word 402(1) is output (e.g., temporarily stored) as the internal representation 406 of the first word 402(1). The internal representation of the first word 402(1) is also provided upstream (indicated by the left to right arrow between the memory cells for first word 402(1) to the memory cell for the second word 402(2) and used to determine an internal representation of the second word 402(2).

The intermediate internal representation of the second word 402(2) is determined based on the internal representation of the first word 402(1) as well as the second word 402(2). The intermediate internal representation of the second word 402(2) is then output (e.g., temporarily stored) as the internal representation 406 of the second word 402(2). The internal representation of the second word 402(2) is also provided upstream (indicated by the left to right arrow between the memory cells for second word 402(2) and the third word 402(3)) to the memory cell for the third word 402(3) and used to determine the internal representation of the third word 402(3). This process continues upstream (i.e., in the direction of the left to right arrows of the representation learning 404) for each remaining word in the input word sequence 402.

In the example shown in FIG. 4, the representation learning 404 includes bi-directional learning. That is, the internal representation of each word 402(1)-402(n) is also provided downstream (i.e., in the direction of the right to left arrows of the representation learning 404). Accordingly, the internal representation of each word 402(1)-402(n−1) is determined based on the upstream words of the input word sequence 402 (i.e., based directly on the next upstream word in the sequence and indirectly based on the other upstream words of the input word sequence 402). Features of the disclosure are also implemented, for example, via unidirectional (i.e., in the direction of the left to right arrows) learning.

Using the internal representations 406 of the words, a sequence of words is predicted for executing the portion of the program on the identified hardware device. The prediction process includes generating an intermediate word sequence 408 and an output word sequence 410. As described below, a plurality of tuning parameter candidates, including candidates determined as being more likely to result in better performance efficiency than other candidates, are used to predict the sequence of words for execution. For example, if a first candidate does not satisfy one or more constraints 314, a next likely candidate is used to predict a word in the sequence.

In one example, the number tuning parameter candidates used during the prediction process is predetermined (i.e., determined prior to runtime). For example, a predetermined number k of predictions are propagated, resulting in k predictions.

The internal representations of the words 402(1)-402(n) in the word sequence 402 are then provided to a similar machine learning structure to generate an intermediate word sequence 408. Each block of the intermediate word sequence 408 in FIG. 4 represents, for example, a memory cell used to intermediately predict a corresponding word 408(1)-408(n) (i.e., a tuning parameter value candidate) of the intermediate word sequence 408.

A first word 408(1) (i.e., first candidate) of the intermediate word sequence 408 is intermediately predicted for executing a portion of the program on the identified hardware device based on the one or more machine learning primitives described above. The internal representation of the first word 408(1) is analyzed based on the one or more constraints 314 for the portion of the program (e.g., portion of the kernel). That is, when the first word 408(1) satisfies each of the one or more constraints 314, the first word 408(1) is intermediately predicted as a parameter value candidate for the output word sequence 410. When the first word 408(1) does not satisfy each of the one or more constraints 314, the first word 408(1) is not selected as a parameter value candidate of the output word sequence 410.

The internal representation of the first word 408(1) is also provided to the next memory cell (i.e., next upstream memory cell) for determining the second word 408(2) of the intermediate word sequence 408. When the second word 408(2) satisfies each of the one or more constraints 314 in lieu of the first word 408(1), the second word 408(2) is intermediately predicted as a parameter value candidate for the output word sequence 410. When the second word 408(2) does not satisfy each of the one or more constraints 314, the second word 408(2) is not selected as a parameter value candidate of the output word sequence 410. The process continues for each of the remaining words in the intermediate word sequence 408.

The prediction process also includes an attention mechanism which compares tuning parameter values to other tuning parameter values to predict which combination of tuning parameter values will result in better performance efficiency for executing the portion of the program on the identified hardware device than other combinations of the tuning parameter value candidates.

For example, the tuning parameter value candidates 410(1)-410(n) in the output word sequence 410 are compared and ranked according to their likelihood of executing the portion of the program with better performance efficiency than other tuning parameter value candidates. One or more of the tuning parameter value candidates (e.g., tuning parameter value candidates determined a being more likely to result in better performance efficiency than other candidates) of the output word sequence 410 are provided back to memory cells of the intermediate word sequence 408 to intermediately predict one or more words 408(1)-408(n) of the intermediate word sequence 408. Accordingly, the machine learning algorithms learn to predict tuning parameter values based on the input tuning parameter values (e.g., values of the input word sequence 402) as well as predicted tuning parameter value candidates fed back to the machine learning algorithms.

The predicted tuning parameter value candidates 410(1)-410(n) in the output word sequence 410 are then converted back to numeric values, as shown at block 308 of FIG. 3 and provided as the predicted executable tuning parameter values 310, shown at FIG. 3, for executing the portion of the program on the identified hardware device.

It should be understood that many variations are possible based on the disclosure herein. Although features and elements are described above in particular combinations, each feature or element can be used alone without the other features and elements or in various combinations with or without other features and elements.

The methods provided include implementation in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements application profiling for power-performance management.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory configured to store data;
   a processor, in communication with the memory, configured to:
   receive tuning parameters each having a numeric value, for configuring a program for execution on an identified hardware device;
   convert the numeric values of the tuning parameters to one or more words;
   predict, using one or more machine language learning algorithms, a specific combination of the words, the prediction based on a performance efficiency of the program when executed on the identified hardware device;
   convert the specific combination of the words to corresponding numeric values to form predicted tuning parameters; and
   execute the program on the identified hardware device using the predicted tuning parameters.

2. The processing device of claim 1, wherein the processor is further configured to sequentially determine a machine language learning representation for each of the words that are input in a word sequence.

3. The processing device of claim 2, wherein the processor is further configured to determine the machine language learning representation for a word in the word sequence based on a determined machine language learning representation of another word in the word sequence.

4. The processing device of claim 2, wherein the processor is configured to:
   predict an intermediate sequence of words based on the machine language learning representation for each of the words;
   determine one word of the intermediate sequence of words to be a candidate word for the specific combination of the words when the one word satisfies each of one or more predetermined constraints; and
   determine the one word of the intermediate sequence of words to not be a candidate word for the specific combination of the words when the one word does not satisfy each of the one or more predetermined constraints.

5. The processing device of claim 4, wherein each of the one or more predetermined constraints indicates whether or not a combination of the words produces an invalid result from executing the program.

6. The processing device of claim 4, wherein the processor is configured to:
   determine a plurality of the words of the intermediate sequence of words to be candidate words for the specific combination of the words; and
   predict a next word in the intermediate sequence of words based on one of the candidate words determined to be more likely to execute the program with better performance efficiency than other words of the candidate words.

7. The processing device of claim 1, wherein the performance efficiency is a measure of a speed or an amount of time to execute the program, and
the processor is configured to determine the specific combination of the words to execute the program on the identified hardware device based on the performance efficiency by predicting the specific combination of the words to cause the program to execute faster or in less time than other combinations of the words.

8. The processing device of claim 1, wherein the numeric values for the predicted tuning parameters are tensor input values.

9. The processing device of claim 1, wherein the one or more machine language learning algorithms comprise at least one of convolutional neural networks, recurrent neural networks and connected neural networks.

10. The processing device of claim 1, wherein the numeric values are converted to the one or more words by at least one of:
converting a numerical value to a word;
converting the numerical value to a plurality of words; and
converting a plurality of the numerical values to a word.

11. A method comprising:
receiving tuning parameters each having a numeric value, for configuring a program for execution on an identified hardware device;
converting the numeric values of the tuning parameters to one or more words;
predicting, using one or more machine language learning algorithms, a specific combination of the words, the prediction based on a performance efficiency of the program when executed on the identified hardware device;
converting the specific combination of the words to corresponding numeric values to form predicted tuning parameters; and
executing the program on the identified hardware device using the predicted tuning parameters.

12. The method of claim 10, further comprising sequentially determining a machine language learning representation for each of the words that are input in a word sequence.

13. The method of claim 12, further comprising determining the machine language learning representation for a word in the word sequence based on a determined machine language learning representation of another word in the word sequence.

14. The method of claim 12, further comprising:
predicting an intermediate sequence of words based on the machine language learning representation for each of the words;
determining one word of the intermediate sequence of words to be a candidate word for the specific combination of the words when the one word satisfies each of one or more predetermined constraints; and
determining the one word of the intermediate sequence of words to not be a candidate word for the specific combination of the words when the one word does not satisfy each of the one or more predetermined constraints.

15. The method of claim 14, wherein each of the one or more predetermined constraints indicates whether or not a combination of the words produces an invalid result from executing the program.

16. The method of claim 14, further comprising:
determining a plurality of the words of the intermediate sequence of words to be candidate words for the specific combination of the words; and
predicting a next word in the intermediate sequence of words based on one of the candidate words determined to be more likely to execute the program with better performance efficiency than other candidate words.

17. The method of claim 16, further comprising ranking each of the plurality of the words of the intermediate sequence of words according to a candidate word's likelihood of executing the program with better performance efficiency than the other candidate words.

18. The method of claim 12, wherein the performance efficiency is a measure of a speed or an amount of time to execute the program, and
the method further comprises determining the specific combination of the words to execute the program on the identified hardware device based on the performance efficiency by predicting the specific combination of the words to cause the program to execute faster or in less time than other combinations of the words.

19. The method of claim 12, wherein the numeric values for the predicted tuning parameters are tensor input values.

20. The method of claim 12, wherein the one or more machine language learning algorithms comprise at least one of convolutional neural networks, recurrent neural networks and connected neural networks.

21. A non-transitory computer-readable storage medium having instructions thereon for causing a computer to execute a method comprising:
receiving tuning parameters each having a numeric value, for configuring a program for execution on an identified hardware device;
converting the numeric values of the tuning parameters to one or more words;
predicting, using one or more machine language learning algorithms, a specific combination of the words, the prediction based on a performance efficiency of the program when executed on the identified hardware device;
converting the specific combination of the words to corresponding numeric values to form predicted tuning parameters; and
executing the program on the identified hardware device using the predicted tuning parameters.

22. A system comprising:
memory configured to store a program; and
circuitry configured to:
receive tuning parameters each having a numeric value, for configuring the program for execution;
convert the numeric values of the tuning parameters to one or more words;
predict, using one or more machine language learning algorithms, a specific combination of the words, the prediction based on a performance efficiency of the program when executed on the circuitry;
convert the specific combination of the words to corresponding numeric values to form predicted tuning parameters; and
execute the program using the predicted tuning parameters.

* * * * *